United States Patent
Takesue et al.

(10) Patent No.: US 6,761,648 B2
(45) Date of Patent: Jul. 13, 2004

(54) GOLF BALL

(75) Inventors: Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/446,657

(22) Filed: May 29, 2003

(65) Prior Publication Data

US 2003/0224874 A1 Dec. 4, 2003

(30) Foreign Application Priority Data

May 30, 2002 (JP) ........................................ 2002-156986

(51) Int. Cl.$^7$ ............................................. A63B 37/06
(52) U.S. Cl. ........................................................ 473/378
(58) Field of Search ............................... 473/378, 377, 473/371, 372

(56) References Cited

U.S. PATENT DOCUMENTS

| | | |
|---|---|---|
| 4,911,451 A | 3/1990 | Sullivan et al. |
| 5,120,791 A | 6/1992 | Sullivan |
| 5,244,969 A | 9/1993 | Yamada |
| 5,306,760 A | 4/1994 | Sullivan |
| 5,312,857 A | 5/1994 | Sullivan |
| 5,656,695 A | 8/1997 | Endo et al. |
| 6,149,536 A * | 11/2000 | Sullivan et al. ............. 473/376 |
| 6,325,731 B1 | 12/2001 | Kennedy et al. |
| 6,329,458 B1 * | 12/2001 | Takesue et al. ............. 524/400 |
| 2003/0224875 A1 | 12/2003 | Takesue et al. |

FOREIGN PATENT DOCUMENTS

| | | |
|---|---|---|
| JP | 02-268779 A | 11/1990 |
| JP | 03-207382 A | 9/1991 |
| JP | 4-49426 B2 | 8/1992 |
| JP | 05-003931 A | 1/1993 |
| JP | 07-194737 A | 8/1995 |
| JP | 09-225068 A | 9/1997 |
| WO | WO 98/46671 A1 | 10/1998 |

* cited by examiner

*Primary Examiner*—Raeann Gorden
(74) *Attorney, Agent, or Firm*—Sughrue Mion, PLLC

(57) ABSTRACT

In a golf ball comprising a core and a cover of one or more layers, the cover or its layer is formed primarily of a mixture comprising a blend of (a) an ionomer resin in the form of a divalent metal-neutralized ethylene-acrylic acid copolymer and (b) an olefin-unsaturated carboxylic acid copolymer or an olefin-unsaturated carboxylic acid-unsaturated carboxylate copolymer, (c) a thermoplastic elastomer, (d) a fatty acid or derivative thereof having a molecular weight of 280 to 1,500, and (e) a basic metal compound. The mixture is thermally stable, flowable and easy to mold and the ball has improved rebound, feel and durability.

6 Claims, No Drawings

GOLF BALL

TECHNICAL FIELD

This invention relates to a golf ball comprising a core and a cover of one or more layers enclosing the core.

BACKGROUND ART

Ionomer resins are frequently used as the base resin for forming the cover of modern golf balls because the ionomer resins have improved durability, cut resistance and resilience or rebound and are easy to work.

However, golf balls using ionomer resins as the cover base resin still leave room for further improvement in rebound performance and flight distance. In particular, many users complain to the manufacturer of their request to drive the ball farther even a little. There is a need to have a golf ball having higher rebound performance and better flight performance.

To meet such a demand, acrylic acid base ionomer resins having higher rebound performance have been used as the cover base resin. See JP-B 4-49426, Japanese Patent Nos. 3,047,919, 3,119,858, 2,979,272, 3,257,739 and JP-A 9-225068. These patents use as the cover base resin a blend of an acrylic acid ionomer resin neutralized with a monovalent ion such as sodium ion and an acrylic acid ionomer resin neutralized with a divalent ion such as zinc ion, or a blend of a binary acrylic acid ionomer resin and a ternary acrylic acid ionomer resin.

The use of a ternary acrylic acid ionomer resin is effective for softening at the substantial sacrifice of resilience. Also, a blend of a monovalent ion-neutralized acrylic acid ionomer resin and a divalent ion-neutralized acrylic acid ionomer resin is insufficient in resilience. There exists a need for further improvement.

Related improvements taught by the prior art (see U.S. Pat. No. 5,312,857, U.S. Pat. No. 5,306,760, and International Application WO 98/46671) include cover materials in which a large amount of metallic soap is added to the ionomer resin to improve the cost and rebound characteristics of the ionomer cover material.

These cover materials, however, fall far short of practical levels. During injection molding, the metallic soap in the cover material decomposes and vaporizes to generate a large amount of fatty acid gas, often causing molding defects. In addition, gas constituents settle on the surface of the molded part to greatly lower the paintability thereof. Moreover, although such cover material in which a large amount of metallic soap has been added to the ionomer resin does exhibit a rebound which is about the same as or better than that of metallic soap-free ionomer cover material having the same degree of hardness, the improvement in rebound is not all that large. Indeed, depending on the type of metallic soap used, the moldability and rebound of cover material may in fact be severely compromised.

SUMMARY OF THE INVENTION

Therefore, an object of the present invention is to provide a golf ball using a cover material based on a binary acrylic acid ionomer resin and having improved thermal stability, fluidity and moldability, which ball has improved rebound, feel and durability.

It has been found that a mixture comprising (a) an ionomer resin in the form of a divalent metal-neutralized ethylene-acrylic acid copolymer, (b) an optional copolymer which is an olefin-unsaturated carboxylic acid copolymer or olefin-unsaturated carboxylic acid-unsaturated carboxylate copolymer, (c) a specific thermoplastic elastomer, (d) a fatty acid or derivative thereof having a molecular weight of 280 to 1,500, and (e) a basic metal compound, in a specific proportion is useful as a cover material because this mixture is thermally stable, flowable and easy to mold, and that a golf ball obtained by molding the mixture has improved rebound, feel and durability.

The present invention relates to a golf ball comprising a core and a cover of one or more layers enclosing the core. According to the invention, at least one layer of the cover is formed primarily of a mixture comprising a blend of (a) an ionomer resin in the form of a divalent metal-neutralized ethylene-acrylic acid copolymer and (b) an olefin-unsaturated carboxylic acid copolymer or an olefin-unsaturated carboxylic acid-unsaturated carboxylate copolymer, (c) a thermoplastic elastomer, (d) a fatty acid or derivative thereof having a molecular weight of 280 to 1,500, and (e) a basic metal compound. The thermoplastic elastomer (c) is selected from the group consisting of an olefin base thermoplastic elastomer, styrene base thermoplastic elastomer, polyester base thermoplastic elastomer, polyurethane base thermoplastic elastomer, and polyamide base thermoplastic elastomer. The ionomer resin (a) and the copolymer (b) are blended in a weight ratio (a)/(b) of from 100/0 to 80/20. The blend and the thermoplastic elastomer (c) are mixed in a weight ratio [(a)+(b)]/(c) of from 100/0 to 50/50. Components (a) to (c) are mixed with components (d) and (e) in a weight ratio [(a)+(b)+(c)]/(d) of from 100/5 to 100/25 and in a weight ratio [(a)+(b)+(c)]/(e) of from 100/0.1 to 100/10.

DESCRIPTION OF THE PREFERRED EMBODIMENTS

Component (a) is an ionomer resin in the form of a divalent metal-neutralized ethylene-acrylic acid copolymer. This ionomer resin is obtained by partially neutralizing acid groups on an ethylene-acrylic acid copolymer with divalent metal ions. The divalent metal ions used herein are, for example, $Zn^{++}$, $Mg^{++}$ and $Ca^{++}$, but not limited thereto, with $Zn^{++}$ being preferred.

Well-known methods may be employed in partially neutralizing acid groups on the ethylene-acrylic acid copolymer with divalent metal ions. One typical method is to mix the ethylene-acrylic acid copolymer with suitable compounds of the metal ions such as formates, acetates, nitrates, carbonates, hydrogen carbonates, chlorides, hydroxides and alkoxides.

The degree of neutralization of acid groups on the ethylene-acrylic acid copolymer with divalent metal ions is preferably 10 to 90%, more preferably 20 to 70%, though not critical. With too high or too low a degree of neutralization, the efficiency of mixing may be compromised.

The ethylene-acrylic acid copolymer can be obtained through random copolymerization of ethylene monomer and acrylic acid monomer by well-known methods. It is recommended that the content of acrylic acid (simply referred to as acid content) in the copolymer be at least 4%, preferably at least 6%, more preferably at least 8%, even more preferably at least 10% by weight, and up to 30%, preferably up to 25%, more preferably up to 20%, even more preferably up to 15% by weight. Too low an acid content may lead to a decline of resilience whereas too high an acid content may detract from workability.

The ionomer resin (a) in the form of a divalent metal-neutralized ethylene-acrylic acid copolymer usually has a Shore D hardness of at least 50, preferably at least 55, more preferably at least 60, and up to 80, preferably up to 75, more preferably up to 70. Too high a hardness may adversely affect the feel of the ball when hit whereas too low a hardness may lead to a decline of resilience.

The ionomer resin (a) in the form of a divalent metal-neutralized ethylene-acrylic acid copolymer is commercially available, for example, under the trade name of Iotek 7010, 7610, 7020, 7030, 7410, 7310 and 4200 from ExxonMobil Chemical, but not limited thereto.

Component (b) is an olefin-unsaturated carboxylic acid copolymer or an olefin-unsaturated carboxylic acid-unsaturated carboxylate copolymer, which can be obtained through random copolymerization of an olefin, an unsaturated carboxylic acid and optionally, an unsaturated carboxylate by well-known methods.

The olefin in the copolymer preferably has at least 2 carbons and up to 8 carbons, more preferably up to 6 carbons. Examples include ethylene, propylene, butene, pentene, hexene, heptene and octene, with ethylene being especially preferred. The olefins may be used alone or in admixture of any.

Examples of the unsaturated carboxylic acid include acrylic acid, methacrylic acid, maleic acid, and fumaric acid. Acrylic acid and methacrylic acid are preferred for compatibility with the ionomer resin (a) in the form of a divalent metal-neutralized ethylene-acrylic acid copolymer, with acrylic acid being especially preferred. The unsaturated carboxylic acids may be used alone or in admixture of any.

The unsaturated carboxylates are preferably lower alkyl esters of the foregoing unsaturated carboxylic acids, but not limited thereto. Examples include methyl methacrylate, ethyl methacrylate, propyl methacrylate, butyl methacrylate, methyl acrylate, ethyl acrylate, propyl acrylate, and butyl acrylate, with butyl acrylate (n-butyl acrylate and isobutyl acrylate) being especially preferred. The unsaturated carboxylates may be used alone or in admixture of any.

It is recommended that the content of unsaturated carboxylic acid (simply referred to as acid content) in the olefin-unsaturated carboxylic acid copolymer or olefin-unsaturated carboxylic acid-unsaturated carboxylate copolymer (b) be at least 4%, preferably at least 6%, more preferably at least 8% by weight, and up to 30%, preferably up to 25%, more preferably up to 20%, even more preferably up to 15% by weight. Too low an acid content may lead to a decline of resilience whereas too high an acid content may detract from workability.

The olefin-unsaturated carboxylic acid copolymer or olefin-unsaturated carboxylic acid-unsaturated carboxylate copolymer (b) is commercially available, for example, under the trade name of ESCOR 5000, 6000, 5020, 5030, 5050, 5070, 5100, 5110, 5200 and 5300 from ExxonMobil Chemical, but not limited thereto.

The olefin-unsaturated carboxylic acid copolymer or olefin-unsaturated carboxylic acid-unsaturated carboxylate copolymer (b) serves to soften the mixture and improve the flow and moldability thereof.

The ionomer resin (a) in the form of a divalent metal-neutralized ethylene-acrylic acid copolymer and the olefin-unsaturated carboxylic acid copolymer or olefin-unsaturated carboxylic acid-unsaturated carboxylate copolymer (b) are blended in a weight ratio (a)/(b) of from 100/0 to 20/80, preferably from 90/10 to 40/60, more preferably from 80/20 to 60/40. Too large an amount of copolymer (b) may detract from resilience.

In the invention, the ionomer resin (a) neutralized with a divalent metal ion as the base polymer may be combined with another ionomer resin neutralized with a metal ion other than the divalent metal ion, insofar as the objects of the invention are not impaired. The amount of the other ionomer resin neutralized with a metal ion other than the divalent metal ion, when added, is set to 10 parts by weight or less, preferably 6 parts by weight or less per 100 parts by weight of the ionomer resin (a) to avoid any degradation of physical properties. Examples of the other ionomer resin which can be used herein include random copolymers obtained through copolymerization of an olefin (e.g., ethylene), an unsaturated carboxylic acid (e.g., acrylic and methacrylic acid, preferably acrylic acid) and optionally, an acrylate (e.g., butyl acrylate), and neutralization with alkali metal ions such as $Na^+$, $K^+$ or $Li^+$.

Component (c) is a thermoplastic elastomer selected from among olefin base thermoplastic elastomers, styrene base thermoplastic elastomers, polyester base thermoplastic elastomers, polyurethane base thermoplastic elastomers, and polyamide base thermoplastic elastomers. The thermoplastic elastomers may be used alone or in admixture of any.

No particular limitation is imposed on the olefin base thermoplastic elastomer, so long as it is a thermoplastic elastomer composed primarily of an olefin. The use of an olefin base thermoplastic elastomer having crystalline polyethylene blocks is preferred.

Suitable examples of crystalline polyethylene block-bearing olefin base thermoplastic elastomers include those having hard segments composed of crystalline polyethylene blocks (E) or crystalline polyethylene blocks (E) in combination with crystalline polystyrene blocks (S), and having soft segments composed of a relatively random copolymer (EB) of ethylene and butylene. The use of a block copolymer having a molecular structure with a hard segment at one or both ends, such as an E-EB, E-EB-E or E-EB-S structure, is especially preferred.

These olefin base thermoplastic elastomers can be prepared by the hydrogenation of a polybutadiene or a styrene-butadiene copolymer.

The polybutadiene or styrene-butadiene copolymer used in hydrogenation is preferably a polybutadiene in which the butadiene structure contains 1,4 polymer blocks which are 95 to 100% composed of 1,4 units, and the overall butadiene structure has a 1,4 unit content of 50 to 100 wt %, and most preferably 80 to 100 wt %. That is, the use of a polybutadiene having a 1,4 unit content of 50 to 100 wt %, and especially 80 to 100 wt %, and in which 95 to 100 wt % of the 1,4 units are included within blocks is preferred.

It is especially preferable for olefin base thermoplastic elastomers having an E-EB-E structure to be prepared by the hydrogenation of a polybutadiene in which both ends of the molecular chain are 1,4 polymerization products rich in 1,4 units, and the center portion of which contains a mixture of 1,4 units and 1,2 units.

The degree of hydrogenation in the polybutadiene or styrene-butadiene copolymer hydrogenation product, expressed as the percent of double bonds in the polybutadiene or styrene-butadiene copolymer that are converted to saturated bonds, is preferably 60 to 100%, and most preferably 90 to 100%. Too low a degree of hydrogenation may lead to deterioration such as gelation in the blending step with the ionomer resin and other components. Moreover, the intermediate layer in the completed golf ball may have an inadequate durability to impact.

In the block copolymers having a molecular structure with a hard segment at one or both ends, such as an E-EB, E-EB-E or E-EB-S structure, which are preferable for use as the olefin base thermoplastic elastomer, the hard segment content is preferably 10 to 50 wt %. A hard segment content which is too high may result in so low a flexibility as to keep the objects of the invention from being effectively achieved, whereas a hard segment content which is too low may lead to problems in molding of the blend.

The olefin base thermoplastic elastomer described above has a melt index at 230° C. of preferably 0.01 to 15 g/10 min, and more preferably 0.03 to 10 g/10 min. Outside the range, problems such as weld lines, sink marks and short shots may arise during injection molding.

The olefin base thermoplastic elastomer has a surface hardness of preferably 10 to 50 in Shore D hardness. Too low a surface hardness may lower the durability of the golf ball to repeated impact, whereas too high a surface hardness may lower the resilience of blends with ionomer resin.

Preferably the olefin base thermoplastic elastomer has a number-average molecular weight of about 30,000 to 800,000.

The above-described crystalline polyethylene block-containing olefin base thermoplastic elastomer may be a commercial product, suitable examples of which include Dynaron 6100P, HSB604 and 4600P (all products of JSR Corporation). The use of Dynaron 6100P in this invention is especially preferred because it is a block polymer having crystalline olefin blocks at both ends. These olefin base thermoplastic elastomers may be used singly or as mixtures of two or more thereof.

The styrene base thermoplastic elastomer used herein is not critical as long as it is a thermoplastic elastomer composed primarily of styrene. Suitable examples include styrene base block copolymers comprising hard segment blocks composed of crystalline polystyrene and soft segment blocks composed of hydrogenated polybutadiene, hydrogenated polyisoprene, EPDM, EPR or the like, preferably hydrogenated polybutadiene.

Commercial products may be used as the styrene base thermoplastic elastomer. For example, multi-block copolymers consisting of styrene blocks and hydrogenated polybutadiene blocks are available under the trade name of Tuftec H1042, H1052, H1075, H1031, H1041, H1065 and H1051 from Asahi Chemical Industry Co., Ltd. The styrene base thermoplastic elastomers may be used alone or in admixture.

The polyester base thermoplastic elastomer is not critical as long as it is a thermoplastic elastomer composed primarily of polyester. Use is preferably made of a polyester base block copolymer composed primarily of high-melting crystalline polymer segments made of crystalline aromatic polyester units and low-melting polymer segments made of aliphatic polyether units and/or aliphatic polyester units.

Preferred examples of the high-melting crystalline polymer segments made of crystalline aromatic polyester units include polybutylene terephthalate derived from terephthalic acid and/or dimethyl terephthalate in combination with 1,4-butanediol. Other suitable, non-limiting, examples include polyesters derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof in combination with a diol having a molecular weight of up to 300, such as an aliphatic diol (e.g., ethylene glycol, trimethylene glycol, pentamethylene glycol, hexamethylene glycol, neopentyl glycol, decamethylene glycol), an alicyclic diol (e.g., 1,4-cyclohexanedimethanol, tricyclodecanedimethylol), or an aromatic diol (e.g., xylylene glycol, bis(p-hydroxy) diphenyl, bis(p-hydroxyphenyl)propane, 2,2-bis[4-(2-hydroxyethoxy)phenyl]propane, bis[4-(2-hydroxy)phenyl] sulfone, 1,1-bis[4-(2-hydroxyethoxy)phenyl]cyclohexane, 4,4'-dihydroxy-p-terphenyl and 4,4'-dihydroxy-p-quarterphenyl). Use can also be made of any copolymeric polyester obtained using two or more of these dicarboxylic acid components and diol components.

In addition, polycarboxylic acid components, polyoxy components and polyhydroxy components having a functionality of three or more can be copolymerized therein within a range of up to 5 mol %.

In the low-melting polymer segments made of aliphatic polyether units and/or aliphatic polyester units, illustrative examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycols, and copolymers of ethylene oxide and tetrahydrofuran. Illustrative examples of the aliphatic polyester include poly(ε-caprolactone), polyenantholactone, polycaprylolactone, poly(butylene adipate) and poly(ethylene adipate).

The low-melting polymer segments preferably have a number-average molecular weight in the copolymerized state of about 300 to 6,000.

In cases where the polyester base thermoplastic elastomer used is composed primarily of high-melting crystalline polymer segments made of crystalline aromatic polyester units and low-melting polymer segments made of aliphatic polyether units and/or aliphatic polyester units, it is advantageous to adjust the amount of low-melting polymer segments made of aliphatic polyether units and/or aliphatic polyester units copolymerized relative to the amount of high-melting crystalline polymer segment made of crystalline aromatic polyester units to at least 15 wt %, and preferably at least 50 wt %, but not more than 90 wt %. If the proportion of low-melting polymer segments made of aliphatic polyether units and/or aliphatic polyester units is too high, the thermoplastic copolymer may have inadequate melt characteristics, which can make it difficult to achieve uniform mixture during melt blending with other components. On the other hand, if the proportion is too low, sufficient flexibility and resilience may not be achieved.

Examples of polyester base thermoplastic elastomers preferred for use in the invention include Hytrel 4001 by DuPont-Toray Co., Ltd., and Primalloy N3000 by Mitsubishi Chemical Corporation.

The polyurethane base thermoplastic elastomer is not critical so long as it is a thermoplastic elastomer composed primarily of polyurethane. Polyurethane thermoplastic elastomers comprising polymeric polyols as the soft segments, and monomolecular chain extenders and diisocyanates as the hard segments are preferred.

Any polymeric polyol may be used without particular limitation. Examples include polyester polyols, polyether polyols, copolyester polyols and polycarbonate polyols, any of which may be used with good results. Illustrative examples of polyester polyols include polycaprolactone glycol, poly(ethylene 1,4-adipate) glycol and poly(butylene 1,4-adipate) glycol. An exemplary polyether polyol is polyoxytetramethylene glycol. Exemplary of the copolyester polyol is poly(diethylene glycol adipate) glycol. Exemplary of the polycarbonate polyol is (hexanediol 1,6-carbonate) glycol.

These polymeric polyols generally have a number-average molecular weight of about 600 to 5,000, preferably about 1,000 to 3,000.

Preferred diisocyanates employed herein are aliphatic and aromatic diisocyanates. Illustrative examples include, but are not limited to, hexamethylene diisocyanate (HDI), 2,2,4- or 2,4,4-trimethylhexamethylene diisocyanate (TMDI), lysine diisocyanate (LDI), tolylene diisocyanate (TDI), and diphenylmethane diisocyanate (MDI). Especially for compatibility with other resins in the blend, hexamethylene diisocyanate (HDI) and diphenylmethane diisocyanate (MDI) are preferred.

Any monomolecular chain extender may be employed. For instance, ordinary polyhydric alcohols and amines are useful. Examples include 1,4-butylene glycol, 1,2-ethylene glycol, 1,3-propylene glycol, 1,6-hexyl glycol, 1,3-butylene glycol, dicyclohexylmethylmethanediamine (hydrogenated MDI) and isophoronediamine (IPDA).

No limitation is imposed on the specific gravity of the polyurethane base thermoplastic elastomer, so long as it is suitably controlled within a range that allows the objects of the invention to be achieved. The specific gravity is preferably from 1.0 to 1.3, and most preferably from 1.1 to 1.25.

Commercial products may be used as the polyurethane base thermoplastic elastomer. Examples include Pandex T7298, EX7895, T7890 and T8198 (all manufactured by DIC Bayer Polymer, Ltd.).

The polyamide base thermoplastic elastomer is not critical as long as it is a thermoplastic elastomer composed primarily of a polyamide. Polyamide base thermoplastic elastomers having polyamide as the hard segment are preferred. Commercial products may be used as the polyamide base thermoplastic elastomer, with an example being Pebax by Toray Industries, Inc.

The thermoplastic elastomer (c) used in the invention preferably has polar groups grafted thereon so as to improve compatibility with the ionomer resin (a) in the form of a divalent metal-neutralized ethylene-acrylic acid copolymer. Suitable, non-limiting examples of such polar groups include carboxyl groups, epoxy groups, hydroxyl groups and amino groups.

The thermoplastic elastomer (c) preferably has a Shore A hardness of 20 to 99, more preferably 25 to 95, even more preferably 30 to 90, and most preferably 35 to 85. Too high a hardness may prevent a sufficient softening effect from being achieved, whereas too low a hardness may lower the flight performance.

In the invention, the blend [(a)+(b)] and component (c) are mixed in a weight ratio [(a)+(b)]/(c) of from 100/0 to 50/50, preferably from 89/11 to 60/40, more preferably from 85/15 to 65/35. Too high a content of component (c) may fail to improve the durability of the golf ball.

Component (d) is a fatty acid or fatty acid derivative having a molecular weight of 280 to 1,500. It has a molecular weight which is much smaller than that of components (a), (b) and (c), and serves to increase the melt viscosity of the mixture and contributes to the improved fluidity of the mixture. Also, because the fatty acid or fatty acid derivative has a high content of acid groups or derivative moieties thereof, its addition to the mixture precludes a substantial loss of rebound.

The molecular weight of fatty acid or fatty acid derivative (d) is at least 280, preferably at least 300, more preferably at least 330, and most preferably at least 360 and up to 1,500, preferably up to 1,000, more preferably up to 600, and most preferably up to 500. Too low a molecular weight fails to improve heat resistance whereas too high a molecular weight fails to improve flow.

The fatty acid or fatty acid derivative (d) may be an unsaturated fatty acid or derivative thereof having a double bond or triple bond in the alkyl group, or it may be a saturated fatty acid or derivative thereof in which all the bonds on the alkyl group are single bonds. It is recommended that the number of carbon atoms on the molecule generally be at least 18, preferably at least 20, more preferably at least 22, and up to 80, preferably up to 60, more preferably up to 40, and even more preferably up to 30. Too few carbons may make it impossible to achieve the improved heat resistance, and may also set the acid group content so high as to cause the acid groups to interact with acid groups present on the base resin, diminishing the flow-improving effects. On the other hand, too many carbons increases the molecular weight, which may also lower the flow-improving effects.

Examples of fatty acids (d) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred, with behenic acid being most preferred.

Fatty acid derivatives (d) include metallic soaps in which the proton on the acid group of the foregoing fatty acid has been substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $Cu^{2+}$, $Sn^{2+}$, $Pb^{2+}$ and $Co^{2+}$. Of these, $Ca^{2+}$, $Mg^{2+}$ and $Zn^{2+}$ are especially preferred.

Examples of the fatty acid derivatives (d) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

In the mixture of the invention, the resin components (a) to (c) and component (d) are combined in a weight ratio [(a)+(b)+(c)]/(d) of from 100/5 to 100/25, preferably from 100/10 to 100/24, and more preferably from 100/15 to 100/22. Too low a content of component (d) gives a mixture which has a low melt viscosity and is difficult to work whereas too high a content of component (d) detracts from durability.

Component (e) is a basic metal compound capable of neutralizing the acid groups in components (a), (b) and (d), which is essential in the inventive material. As already noted in the preamble, absent component (e), heating and mixing only a metal soap-modified ionomer resin (e.g., only a metallic soap-modified ionomer resin of the type described in the above-cited patents) results in formation of a large amount of fatty acid due to an exchange reaction between the metallic soap and unneutralized acid groups on the ionomer resin. Because the fatty acid thus formed is thermal unstable and readily vaporizes during molding, this causes molding defects. In addition, the fatty acid thus formed settles on the surface of the molded part, substantially lowering the ability of a paint film to adhere thereto.

In order to resolve such problems, the present invention incorporates a basic metal compound (e) which neutralizes the acid groups present in the base resin composed of components (a), (b) and (c) and in component (d) for improving the rebound properties of a molded part.

Incorporating component (e) serves to neutralize the acid groups in the base resin and in component (d) to an appropriate extent. These components, when blended together in an optimum proportion, act synergistically to increase the thermal stability of the mixture, impart good moldability and enhance rebound characteristics.

It is recommended that the basic metal compound (e) be highly reactive with the base resin so that the degree of neutralization of the mixture may be increased without detracting from thermal stability.

Exemplary metal ions that can be used in the basic metal compound (e) include $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Sn^{2+}$, $Pb^{2+}$ and $Co^{2+}$. Examples of basic metal compound include well-known basic inorganic fillers containing these metal ions, such as magnesium oxide, magnesium hydroxide, magnesium carbonate, zinc oxide, sodium hydroxide, sodium carbonate, calcium oxide, calcium hydroxide, lithium hydroxide and lithium carbonate. Of these, hydroxides and monoxides are preferred. Inter alia, calcium hydroxide and magnesium oxide, especially calcium hydroxide, are preferred since they are more reactive with the base resin.

In the mixture of the invention, the resin components (a) to (c) and component (e) are combined in a weight ratio [(a)+(b)+(c)]/(e) of from 100/0.1 to 100/10, preferably from 100/0.5 to 100/8, more preferably from 100/1 to 100/6, and most preferably from 100/2 to 100/5. Too low a content of component (e) fails to improve thermal stability and rebound. With too high a content of component (e), an excess of basic metal compound rather adversely affects the heat resistance of the golf ball material.

As mentioned above, the golf ball of the invention is defined as comprising a core and a cover of one or more layers enclosing the core wherein at least one layer of the cover is formed primarily of a mixture of components (a), (b), (c), (d) and (e) in a specific proportion. In the mixture of components (a) to (e), various additives may be compounded if necessary. Suitable additives include pigments, dispersants, antioxidants, UV absorbers and light stabilizers.

When such additives are compounded, the amount is determined as appropriate insofar as the objects of the invention are not impaired. Preferably additives are compounded in amounts of at least 0.1 part, more preferably at least 0.5 part by weight, and up to 10 parts, more preferably up to 5 parts by weight per 100 parts by weight of the resinous components combined, i.e., (a)+(b)+(c).

Any desired method may be employed in obtaining the mixture of components (a) to (e) in a specific proportion to be used in the golf ball material of the present invention. For instance, the components are heated and mixed at a temperature of 150 to 250° C. and in an internal mixer such as a kneading-type twin-screw extruder, Banbury mixer or kneader. Any desired method may be used to incorporate various additives together with components (a) to (e) in the golf ball material of the invention. For example, the additives may be blended with components (a) to (e), and heating and mixing of all the ingredients carried out at the same time. Alternatively, components (a) to (e) may be pre-heated and pre-mixed, following which the optional additives may be added and the overall composition subjected to additional heating and mixing.

The golf ball material should preferably have a melt flow rate adjusted to ensure particularly suitable flow characteristics for injection molding and thus improve moldability. Specifically, it is recommended that the melt flow rate (MFR), as measured according to JIS-K7210 at a temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but generally not more than 20 dg/min, preferably not more than 10 dg/min, more preferably not more than 5 dg/min, and most preferably not more than 3 dg/min. Too large or small a melt flow rate may result in a marked decline in melt processability.

It is recommended that the compounding of the golf ball material be adjusted such that the molded part thereof have a Shore D hardness of at least 40, preferably at least 45, more preferably at least 50 and up to 70, preferably up to 65, more preferably up to 60. Too high a Shore D hardness may substantially compromise the feel on impact of the golf ball whereas too low a Shore D hardness may lead to a decline of resilience.

The golf ball material of the invention may have any desired specific gravity although it is recommended that the specific gravity be at least 0.9, preferably at least 0.92, more preferably at least 0.93 and up to 1.2, preferably up to 1.1, more preferably up to 1.05.

The golf ball of the invention has a molded part of the golf ball material according to the invention as a constituent of the cover. In the golf ball comprising a core and a cover of one or more layers, at least one layer of the cover is formed primarily of the mixture of components (a) to (e) in a specific proportion. That is, the molded part of the golf ball material is used as at least one layer of the cover.

In the golf ball of the invention, the core may be either a solid core or a thread-wound core and may be produced by a conventional method.

For example, a solid core may be produced by compounding 100 parts by weight of cis-1,4-polybutadiene; from 10 to 60 parts by weight of one or more vulcanizing or crosslinking agents selected from among α,β-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant to form a rubber composition. The rubber composition can then be formed into a spherical solid core by press vulcanization to effect crosslinkage, followed by compression under heating at 140 to 170° C. for a period of 10 to 40 minutes.

Production of a thread-wound core may be carried out using either a liquid or a solid center. In the case of a liquid center, a hollow spherical center envelope may be formed from the above-described rubber composition, for example, and a liquid filled into this envelope by a well-known method. If a solid center is used instead, the solid center may be produced by the solid core production method described above. Thereafter, rubber thread is wound in a stretched state about the center to form the core. Use may be made of rubber thread produced by a conventional method. For example, rubber thread is prepared by compounding natural rubber or synthetic rubber such as polyisoprene with various additives (e.g., antioxidants, vulcanization accelerators and sulfur) to form a rubber composition, which is molded and vulcanized.

The golf balls using the various types of cores described above and falling within the scope of the invention can be produced by forming the cover from the inventive golf ball material. In one such method, a single-layer or multi-layer core prefabricated according to the type of ball to be manufactured is placed in a mold, and the inventive golf ball material is heated, mixed and melted, then injection-molded over the core. The method of producing the cover is not limited to the injection molding. In an alternative method which can be used herein, a pair of hemispherical cups are molded from the inventive golf ball material, following which the cups are placed over a core and molded under heat (120 to 170° C.) and pressure for 1 to 5 minutes.

The cover of the golf ball of the invention may be either a single layer or a multilayer structure of two or more layers. In the case of single layer cover, the cover is solely made of the cover material of the invention to give a two-piece golf ball. In the multilayer structure, the cover material of the invention may be used as an inner layer or the outermost layer of the cover. When the golf ball of the invention is a multi-piece golf ball comprising a cover of two or more layers, the use of a layer formed primarily of the mixture as the cover outermost layer offers the advantage of significantly improved feel, and the use of the same as a cover inner layer other than the outermost layer offers the advantage of significantly improved resilience or rebound. When the cover material of the invention is used as a cover inner layer, the outermost layer is preferably formed of an ionomer resin or polyurethane base elastomer. This results in a golf ball having significantly improved rebound properties due to the synergistic combination of the materials of the inner and outer layers. It is also possible to form both the cover inner and outermost layers from the cover materials of the invention. When the cover material of the invention is used as the outermost layer of the multilayer cover, the cover inner layer(s) may be formed of an ionomer resin or thermoplastic elastomer.

No particular limitation is imposed on the thickness or gage of the cover made of the inventive material, although the cover is generally formed to a thickness of at least 0.5 mm, preferably at least 0.9 mm, more preferably at least 1.1 mm, and up to 3 mm, preferably up to 2.5 mm, more preferably up to 2.0 mm. Too large a cover thickness may compromise resilience whereas too small a cover thickness may interfere with effective molding. When the cover is made of two or more layers, the total thickness of these layers is generally at least 1.0 mm, preferably at least 1.8 mm, more preferably at least 2.2 mm and up to 6 mm, preferably up to 5 mm, more preferably up to 4 mm.

Most often, the golf ball has a plurality of dimples formed on its surface. The cover may be administered various treatment such as surface preparation, stamping and painting. In particular, a golf ball cover made of the inventive material ensures ease of work involved in administering such surface treatment.

In the golf balls manufactured as described above, the diameter, weight, hardness and other parameters of the cover, solid or liquid center, solid core or thread-wound core, and one-piece golf balls, while not subject to any particular limitations, may be adjusted as appropriate, insofar as the objects of the invention are attainable.

The golf ball of the invention may be manufactured for use in tournaments by giving it a diameter and weight which conform with the Rules of Golf. That is, the ball may be produced to a diameter of not less than 42.67 mm and a weight of not greater than 45.93 g.

EXAMPLE

Examples of the invention and comparative examples are given below by way of illustration, and are not intended to limit the invention.

Examples 1–4 and Comparative Examples 1–3, 6–10

Using a core material composed primarily of cis-1,4-polybutadiene, a solid core A was produced having a diameter of 36.5 mm, a weight of 31.1 g, and a deflection of 3.8 mm under an applied load of 100 kg.

An intermediate layer material of the formulation (in pbw) shown in Table 1 was injection molded over the core to form an intermediate layer of 1.6 mm thick. A cover material of the formulation (in pbw) shown in Table 1 was injection molded over the intermediate layer to form a cover of 1.5 mm thick, yielding a three-piece golf ball having a diameter of 42.7 mm.

Examples 5–6 and Comparative Examples 4–5

Using a core material composed primarily of cis-1,4-polybutadiene, a solid core B was produced having a diameter of 38.5 mm, a weight of 35.1 g, and a deflection of 3.2 mm under an applied load of 100 kg.

A mixture was prepared by mixing ingredients according to the formulation (in pbw) shown in Table 1 in a kneading type twin screw extruder at 200° C., extruding and shaping into pellets. The mixture in pellet form was injected into a mold with the solid core B set therein to form a cover of 2.1 mm thick, yielding a two-piece golf ball having a diameter of 42.7 mm.

The following characteristics were measured or evaluated for the golf balls obtained in each of the above examples. The results are also shown in Table 1.

Ball Hardness

Measured as the deflection (in millimeters) of the ball under an applied load of 100 kg.

Initial Velocity

Measured using the same type of initial velocity instrument as that approved by the United States Golf Association (USGA), and in accordance with USGA rules.

Feel

Five golfers actually shot the ball at a head speed of 45 m/s (HS45). The feel of the ball was rated as follows.

⊚: very soft

○: soft

Δ: ordinary

X: hard

Flight Performance

Using a hitting machine of True Temper, the ball was struck with a driver (W#1) at a head speed of 45 m/s (HS45). The spin rate, carry and total distance were measured. The club used was PRO 230 TITAN (loft angle 11°, shaft Harmotec Lite HM50J(HK), hardness S, balance D2, by Bridgestone Sports Co., Ltd.).

Durability Against Impact

The ball was consecutively struck 300 times at a head speed of 38 m/sec and examined whether or not it cracked.

TABLE 1

| | | Shore D | MI | Example | | | | | | Comparative Example | | | | | | | | | |
|---|---|---|---|---|---|---|---|---|---|---|---|---|---|---|---|---|---|---|---|
| | | | | 1 | 2 | 3 | 4 | 5 | 6 | 1 | 2 | 3 | 4 | 5 | 6 | 7 | 8 | 9 | 10 |
| | | | | A | A | A | A | B | B | A | A | A | B | B | A | A | A | A | A |
| Intermediate layer | Component (a) Iotek 7010 | 57 | 0.8 | 35 | 42 | 20 | 35 | | | | | | | | | | 40 | | |
| | Iotek 7030 | 52 | 2.5 | | | | | | | | | | | | | | | | 50 |
| | Iotek 8000 | 63 | 0.8 | | | | | | | | | | | | 56 | | 40 | 35 | |
| | Iotek 3110 | 58 | 1.3 | | | | | | | | | | | | | 100 | | | |
| | Surlyn 8945 | 63 | 5.6 | | | | | | | 35 | 42 | 35 | | | | | | | |
| | Surlyn 9945 | 61 | 4.4 | | | | | | | 35 | 42 | 35 | | | | | | | |
| | Himilan 1706 | 60 | 0.7 | | | | | | | | | | | | | | | 25 | |
| | Himilan 1707 | 62 | 0.9 | | | | | | | | | | | | | | | 35 | |
| | Component (b) ESCOR 5100 | 36 | | 35 | 42 | 50 | 35 | 35 | 42 | | | | | | 44 | | | | |
| | Iotek 7520 | 33 | 2.0 | | | | | | | | | | | | | | | 5 | |
| | Himilan 1855 | 54 | 1.0 | | | | | | | | | | | | | | 20 | | |
| | Component (c) Dynaron 6100P | | | 30 | 16 | 30 | | | | 30 | 16 | 30 | | | | | | | |
| | Dynaron 4600P | | | | | | 30 | | | | | | | | | | | | |
| | Component (d) NAA 222-S | | | 20 | 20 | 20 | 20 | | | 20 | | | | | | | | | 20 |
| | Zn stearate | | | | | | | | | | | | | | | | | | |
| | Component (e) CLS-B | | | 2.9 | 3.1 | 3.1 | 3.1 | | | | | | | | | | | | |
| | Resin Hardness (Shore D) | | | 53 | 56 | 53 | 51 | | | 56 | 58 | 53 | | | 53 | 60 | 59 | 61 | 63 |
| | Thickness (mm) | | | 1.6 | 1.6 | 1.6 | 1.6 | | | 1.6 | 1.6 | 1.6 | | | 1.6 | 1.6 | 1.6 | 1.6 | 1.6 |
| Cover | Component (a) Iotek 7010 | | | 50 | 50 | 50 | 50 | | | 50 | 50 | 50 | | | 50 | 50 | 50 | 50 | 50 |
| | Iotek 8000 | | | 50 | 50 | 50 | 50 | | | 50 | 50 | 50 | | | 50 | 50 | 50 | 50 | 50 |
| | Himilan 1557 | | | | | | | 35 | | | | | 35 | | | | | | |
| | Himilan 1601 | | | | | | | | 42 | | | | | 42 | | | | | |
| | Himilan | | | | | | | | | | | | | | | | | | |

TABLE 1-continued

| | | | Example | | | | | | Comparative Example | | | | | | | | | |
|---|---|---|---|---|---|---|---|---|---|---|---|---|---|---|---|---|---|---|
| | Shore | | 1 | 2 | 3 | 4 | 5 | 6 | 1 | 2 | 3 | 4 | 5 | 6 | 7 | 8 | 9 | 10 |
| | D | MI | | | | | | | | | Core | | | | | | | |
| | | | A | A | A | A | B | B | A | A | A | B | B | A | A | A | A | A |
| Component (b) | 1605 | | | | | | | | | | | | | | | | | |
| | Himilan 1706 | | | | | | 35 | 42 | | | | 35 | 42 | | | | | |
| Component (b) | ESCOR 5100 | | | | | | | 16 | | | | | 16 | | | | | |
| Component (c) | Dynaron 6100P | | | | | | 30 | 20 | | | | 30 | | | | | | |
| Component (d) | NAA | | | | | | 20 | 20 | | | | | | | | | | |
| Component (e) | 222-S CLS-B | | | | | | 2.9 | 3.1 | | | | | | | | | | |
| Titanium dioxide | | | 2 | 2 | 2 | 2 | 2 | 2 | 2 | 2 | 2 | 2 | 2 | 2 | 2 | 2 | 2 | 2 |
| Resin hardness (Shore D) | | | 59 | 59 | 59 | 59 | 53 | 56 | 59 | 59 | 59 | 56 | 58 | 59 | 59 | 59 | 59 | 59 |
| Ball | Thickness (mm) | | 1.5 | 1.5 | 1.5 | 1.5 | 1.5 | 1.5 | 1.5 | 1.5 | 1.5 | 2.1 | 2.1 | 1.5 | 1.5 | 1.5 | 1.5 | 1.5 |
| | Weight (g) | | 45.2 | 45.3 | 45.2 | 45.2 | 45.2 | 45.3 | 45.2 | 45.3 | 45.2 | 45.2 | 45.3 | 45.3 | 45.3 | 45.3 | 45.3 | 45.3 |
| | Hardness (mm) | | 3.2 | 3.0 | 3.2 | 3.4 | 2.7 | 2.5 | 3.0 | 2.8 | 3.2 | 2.5 | 2.4 | 3.2 | 2.6 | 2.7 | 2.5 | 2.3 |
| | Initial velocity (m/sec) | | 77.4 | 77.5 | 77.4 | 77.4 | 77.5 | 77.6 | 77.2 | 77.3 | 77.1 | 77.3 | 77.4 | 76.8 | 77.2 | 77.1 | 77.2 | 77.4 |
| | Feel | | ⊙ | ⊙ | ⊙ | ⊙ | ⊙ | ⊙ | ⊙ | ○ | ⊙ | ⊙ | ○ | ⊙ | △ | △ | × | × |
| | Flight performance (W#1/HS45) | Spin (rpm) | 2550 | 2530 | 2550 | 2580 | 2470 | 2450 | 2580 | 2510 | 2550 | 2450 | 2400 | 2540 | 2500 | 2520 | 2450 | 2350 |
| | | Carry (m) | 220 | 220 | 220 | 220 | 222 | 222 | 218.5 | 218 | 218.5 | 220 | 220 | 217 | 218.5 | 218.5 | 218.5 | 219 |
| | | Total (m) | 229 | 230 | 229 | 227 | 231 | 231 | 227 | 227 | 227 | 229 | 229 | 225 | 227 | 227 | 227 | 227 |
| | Durability | | no crack | no crack | no crack | no crack | no crack | no crack | no crack | no crack | no crack | no crack | no crack | cracked | cracked | cracked | cracked | cracked |

Trade names and materials mentioned in Table are described below.

Iotek 7010, 7030: ExxonMobil Chemical, zinc ion-neutralized ethylene-acrylic acid copolymer Iotek 8000, 3110: ExxonMobil Chemical, sodium ion-neutralized ethylene-acrylic acid copolymer Iotek 7520: ExxonMobil Chemical, zinc ion-neutralized ethylene-acrylic acid-acrylate terpolymer Surlyn 8945: Dupont, sodium ion-neutralized ethylene-methacrylic acid copolymer Surlyn 9945: Dupont, zinc ion-neutralized ethylene-methacrylic acid copolymer Himilan 1601, 1605, 1707: Dupont-Mitsui Polychemicals Co., Ltd., sodium ion-neutralized ethylene-methacrylic acid copolymer Himilan 1706, 1557: Dupont-Mitsui Polychemicals Co., Ltd., zinc ion-neutralized ethylene-methacrylic acid copolymer Himilan 1855: Dupont-Mitsui Polychemicals Co., Ltd., zinc ion-neutralized ethylene-methacrylic acid-acrylate terpolymer ESCOR 5100: ExxonMobil Chemical, ethylene-acrylic acid copolymer Dynaron 6100P: JSR Corporation, crystalline polyethylene-ethylene butylene-crystalline ethylene block copolymer Dynaron 4600P: JSR Corporation, styrene-ethylene butylenes-crystalline ethylene block copolymer NAA 222-S: NOF Corp., behenic acid Zn stearate: NOF Corp., zinc stearate CLS-B: Shiraishi Industry Co., Ltd., calcium hydroxide There has been described a golf ball cover material which is thermally stable, flowable and easy to mold. Golf balls using the cover material have improved rebound, feel and durability.

Japanese Patent Application No. 2002-156986 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising a core and a cover of one or more layers enclosing the core, wherein at least one layer of the cover is formed primarily of a mixture comprising a blend of (a) an ionomer resin in the form of a divalent metal-neutralized ethylene-acrylic acid copolymer and (b) an olefin-unsaturated carboxylic acid copolymer or an olefin-unsaturated carboxylic acid-unsaturated carboxylate copolymer in a weight ratio (a)/(b) of from 90/10 to 40/60, (c) a thermoplastic elastomer selected from the group consisting of an olefin base thermoplastic elastomer, styrene base thermoplastic elastomer, polyester base thermoplastic elastomer, polyurethane base thermoplastic elastomer, and polyamide base thermoplastic elastomer, the blend and the thermoplastic elastomer (c) being mixed in a weight ratio [(a)+(b)]/(c) of from 100/0 to 50/50, (d) a fatty acid or derivative thereof having a molecular weight of 280 to 1,500 in a weight ratio [(a)+(b)+(c)]/(d) of from 100/5 to 100/25, and (e) a basic metal compound in a weight ratio [(a)+(b)+(c)]/(e) of from 100/0.1 to 100/10.

2. The golf ball of claim 1 wherein the thermoplastic elastomer is an olefin base thermoplastic elastomer having crystalline polyethylene blocks.

3. The golf ball of claim 1 wherein the cover consists of more than one layer, at least one layer other than the outermost layer being formed primarily of said mixture.

4. A golf ball comprising a core and a cover of one or more layers enclosing the core, wherein at least one layer of the cover is formed primarily of a mixture comprising a blend of (a) an ionomer resin in the form of a divalent metal-neutralized ethylene-acrylic acid copolymer and (b) an olefin-unsaturated carboxylic acid copolymer or an olefin-unsaturated carboxylic acid-unsaturated carboxylate copolymer in a weight ratio (a)/(b) of from 100/0 to 20/80, (c) a thermoplastic elastomer selected from the group consisting of an olefin base thermoplastic elastomer, styrene base-thermoplastic elastomer, polyester base thermoplastic elastomer, polyurethane base thermoplastic elastomer, and polyamide base thermoplastic elastomer, the blend and the thermoplastic elastomer (c) being mixed in a weight ratio [(a)+(b)]/(c) of from 89/11 to 60/40, (d) a fatty acid or derivative thereof having a molecular weight of 280 to 1,500 in a weight ratio [(a)+(b)+(c)]/(d) of from 100/5 to 100/25, and (e) a basic metal compound in a weight ration [(a)+(b)+(c)]/(e) of from 100/0.1 to 100/10.

5. The golf ball of claim 4 wherein the thermoplastic elastomer is an olefin base thermoplastic elastomer having crystalline polyethylene blocks.

6. The golf ball of claim 4 wherein the cover consists of more than one layer, at least one layer other than the outermost layer being formed primarily of said mixture.

* * * * *